(12) United States Patent
Yokota

(10) Patent No.: US 6,334,003 B1
(45) Date of Patent: *Dec. 25, 2001

(54) DATA INPUT SYSTEM FOR ENABLING DATA INPUT BY WRITING WITHOUT USING TABLET OR THE LIKE

(75) Inventor: Kazuaki Yokota, Tokyo (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,184

(22) Filed: Apr. 6, 1999

(30) Foreign Application Priority Data

May 19, 1998 (JP) .................................................. 10-136626

(51) Int. Cl.[7] .............................. G06K 9/00; G06K 9/03; G06K 9/22; G09G 5/00; H04N 1/024
(52) U.S. Cl. ............................ 382/313; 382/120; 382/121; 382/122; 382/181; 382/187; 382/188; 382/202; 382/309; 382/312; 345/179; 358/473; 358/478
(58) Field of Search ..................................... 382/181, 185, 382/186, 187, 309, 313, 314, 113, 120, 121, 122, 188, 190, 198, 202, 312, 315; 345/173, 179; 358/473, 474, 478

(56) References Cited

U.S. PATENT DOCUMENTS

| | | | |
|---|---|---|---|
| 5,311,207 | * 5/1994 | Kusumoto et al. | 345/150 |
| 5,369,262 | * 11/1994 | Dvorkis et al. | 345/179 |
| 5,544,260 | * 8/1996 | Chefalas et al. | 382/187 |
| 5,559,944 | * 9/1996 | Ono | 345/353 |
| 5,561,446 | * 10/1996 | Montlick | 345/173 |
| 5,689,667 | * 11/1997 | Kurtenbach | 345/352 |
| 5,926,178 | * 7/1999 | Kurtenbach | 345/352 |
| 5,959,629 | * 9/1999 | Masui | 345/347 |
| 5,999,666 | * 12/1999 | Gobeli et al. | 382/313 |
| 6,081,629 | * 6/2000 | Browning | 382/313 |

* cited by examiner

Primary Examiner—Leo Boudreau
Assistant Examiner—Daniel G. Mariam
(74) Attorney, Agent, or Firm—Finnegan, Henderson, Farabow, Garrett & Dunner, L.L.P.

(57) ABSTRACT

A data input system is provided with an input pen. A sequence of characters are traced with the input pen, and image data on them are read from the image scanner incorporated in the input pen. Each character is recognized on the basis of the image data. If a recognition error occurs during the input processing, a correct character is written with the input pen. A locus of movement is traced on the basis of moving distance data, which is obtained by a moving distance sensor and includes a moving distance and a moving direction. A character represented by the traced locus is recognized.

13 Claims, 7 Drawing Sheets

(a) MOVEMENT OF PEN   (b) DISPLAY ON SCREEN (a) MOVEMENT OF PEN   (b) DISPLAY ON SCREEN (a) MOVEMENT OF PEN (b) DISPLAY ON SCREEN

DATA INPUT SYSTEM FOR ENABLING DATA INPUT BY WRITING WITHOUT USING TABLET OR THE LIKE

BACKGROUND OF THE INVENTION

The present invention relates to a data input system applicable to a POS (Point Of Sales) terminal or a PDA (Personal Digital Assistant).

Computers are in remarkably wide use in recent years, and in connection therewith an attempt to computerize information are being made in various kinds of business. Computerized information of various kinds are now indispensable to determining management strategy.

In the distributive industry, an ID number is attached to each article for sale, and the distribution of articles is recorded on the basis of the ID numbers. By so doing, high-efficiency management of stocks and order placement and acceptance is intended. In addition, accumulated data are analyzed to work out an effective sale strategy.

In general, ID numbers of articles and similar kind of data are entered from a keyboard. Since the amount of data that must be entered increases steadily, the data input operation is a burden.

Under these circumstances, various types of data input means, which may supersede keyboards, have been developed. Among such data input means is an OCR (Optical Character Recognition) system, which recognizes characters on a sheet of paper on the basis of the intensity pattern of light reflected from the sheet of paper. To enter characters, the operator is only required to trace the characters by means of a pen-type input device (input pen) having an image scanner at the distal end. Therefore, when an ID number attached to an article is input from a POS terminal or the like, the use of the OCR system is very efficient in comparison with a keyboard.

To recognize characters on a sheet of paper, the OCR system radiates light to them from a light source and detects the reflected light by a sensor. The intensity pattern of the reflected light is acquired, and an intensity pattern closest to the acquired pattern is selected from among the patterns stored in a dictionary beforehand. If the sheet of paper is stained, however, the OCR system may make an error in recognizing characters or may not be able recognize them at all. In such cases, corrections have to be entered from another type of input device, namely, a keyboard.

However, if the data entered from an input pen must be corrected by means of a keyboard, the user is required to switch the input device each time a correction is entered. Since this results in a deterioration in the operating efficiency, the correcting method described above is not suitable when the amount of data to be entered is very large.

BRIEF SUMMARY OF THE INVENTION

Accordingly, an object of the present invention is to provide a data input system which enables data input by writing without using a tablet or the like and thus realizes more efficient data input than before, e.g., lighten the burden on the user when corrections are made to the characters recognized by the OCR system.

To attain the above object, the present invention provides a data input system comprising: an image scanner; a moving distance sensor; first character recognition means for cutting out a character region from image data read by the image scanner and for executing character recognition; correction-required character specifying means for specifying a character from among a sequence of characters recognized by the first character recognition means; second character recognition means for tracing a locus of movement based on moving distance data including the moving distance and moving direction obtained by the moving distance sensor, and for recognizing a character represented by the locus of movement; and recognized character correcting means for replacing a character recognized by the first character recognizing means and specified as a correction-required character by the correction-required character specifying means with a character recognized by the second character recognition means.

According to the data input system of the present invention, image data on a sequence of characters are entered from an image scanner, which is incorporated in an input pen, by tracing the characters with the input pen. Each of the characters is identified based on the entered image data. If, in this input processing, an error in recognition occurs, the correct character is written with the input pen. By so doing, moving distance data, including a moving distance and a moving direction, are obtained by a moving distance sensor. On the basis of the moving distance data, a locus of movement is traced, and a character corresponding to the locus of movement is recognized.

As can be seen from the above, the data input system of the present invention does not compel the user to switch input devices between an ordinary input operation and a correcting operation. Accordingly, the working efficiency does not deteriorate.

The present invention also provides a data input system comprising: an image scanner; a moving distance sensor; first character recognition means for cutting out a character region from image data read by the image scanner and for performing character recognition; second character recognition means for tracing a locus of movement based on moving distance data including the moving distance and moving direction obtained by the moving distance sensor, and for recognizing a character represented by the locus of movement; and distinguishing means for automatically distinguishing among newly input data provided by the first character recognition means, corrected input data provided by the first character recognition means, newly input data provided by the second character recognition means, and corrected input data provided by the second character recognition means.

The data input system of the present invention has the first and second input modes. In the first input mode, image data on a sequence of characters are entered from an image scanner, which is incorporated in the input pen, by tracing the characters with the input pen. Each of the characters is identified based on the entered image data. In the second input mode, a character is written with the input pen. By the writing of the character, moving distance data, including a moving distance and a moving direction, are obtained by a moving distance sensor. On the basis of the moving distance data, a locus of movement is traced, and a character corresponding to the locus of movement is recognized. In addition, the input mode used for the data input operation is automatically specified in accordance with the manner in which the input pen is used.

Therefore, the data input system of the present invention does not compel the user to switch input modes during a data input operation. Accordingly, the efficiency of the data input operation is enhanced.

The present invention further provides a data input system which is used for selecting and designating an item from among a plurality of items prepared beforehand as options, and which comprises: a moving distance sensor; and item selection means for tracing a locus of movement based on moving distance data including a moving distance and a moving direction obtained by the moving distance sensor, and for selecting an item from among the plurality of items in accordance with the locus of movement traced.

The data input system of the present invention of the present invention recognizes a line segment or a graphic pattern, drawn with an input pen or the like, in accordance with a locus of movement. The locus of movement is traced on the basis of moving distance data including a moving distance and a moving direction and obtained by the moving distance sensor. In accordance with the recognized line segment or graphic pattern, the data input system executes item selection.

As can be seen from the above, the data input system of the present invention enables the user to perform an item selection operation by means of an input pen, with no need to employ a tablet.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

(First Embodiment)

Figure 1:
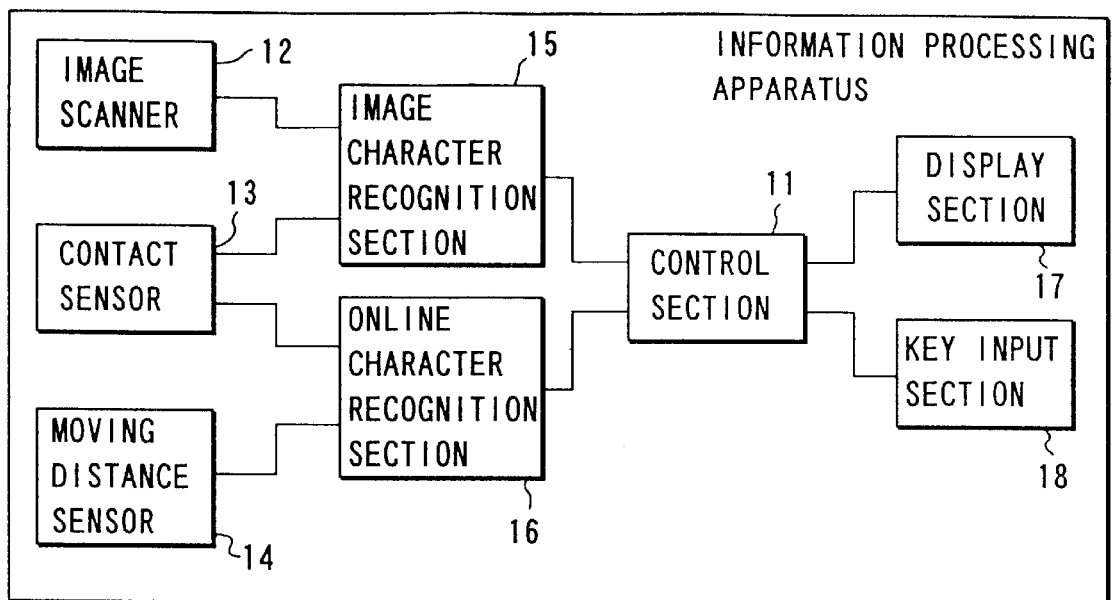
FIG. 1 is a diagram showing the function blocks of a data input system, which is employed in an information processing apparatus according to the first embodiment of the present invention.

First of all, the first embodiment of the present invention will be described. FIG. 1 is a diagram showing the function blocks of a data input system employed in an information processing apparatus according to the first embodiment of the present invention. As shown in FIG. 1, the data input system of the first embodiment comprises a control section 11, an image scanner 12, a contact sensor 13, a moving distance sensor 14, an image character recognition section 15, an online character recognition section 16, a display section 17 and a key input section 18.

The control section 11 controls the entire data input system of the first embodiment. The image scanner 12 incorporates a light source and a light sensor. The light source emits light to a character to be recognized, and the light sensor detects the intensity pattern of the light reflected from the character. Image data based on the intensity pattern is read from the image scanner 12. The contact sensor 13 is, for example, a switch that is turned on when it is applied with a pressure higher than the predetermined value. When the contact sensor 13 is in contact with something, it outputs a signal indicative of that contact state. The moving distance sensor 14 is, for example, a displacement sensor that comprises at least three coils extending in different directions. When an object to be measured is moved, the currents generated and flowing through the coils are measured, and on the basis of this measurement, the moving direction and moving distance of the object are detected. The moving distance sensor 14 outputs moving distance data including a direction, in response to the movement of the object.

The image character recognition section 15 cuts out a character region from image data, which is read from the image scanner 12 when the contact sensor 13 keeps outputting the signal indicative of a contact state. The image character recognition section 15 performs character recognition with respect to the cutout character region. This character recognition is performed by comparing the pattern of the character in the character region with all patterns that are stored in a dictionary beforehand and selecting a pattern of the greatest similarity. The online character recognition section 16 traces the locus of movement on the basis of the moving distance data (incl. a moving direction) which is output from the moving distance sensor 13 when the contact sensor 13 outputs the signal indicative of a contact state. On the basis of the traced locus of movement, the online character recognition section 16 recognizes a character. This character recognition is executed by comparing the pattern represented by the traced locus of movement with all patterns that are stored in a dictionary beforehand and selecting a pattern of the greatest similarity.

The display section 17 displays data such as a character string recognized by the image character recognition section 15 and the online character recognition section 16. The key input section 18 is used for entering operation commands.

Figure 2:
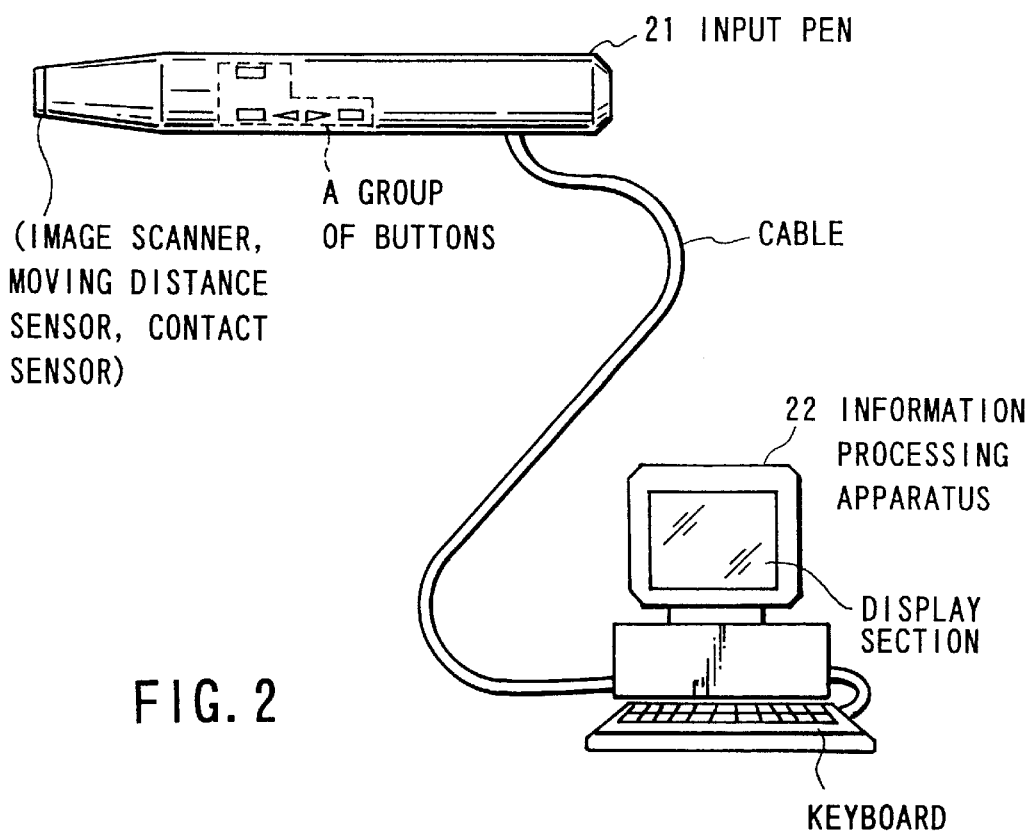
FIG. 2 is a system configuration of the information processing apparatus of the first embodiment.

FIG. 2 is a system configuration of the information processing apparatus of the first embodiment. As shown in FIG. 2, the information processing apparatus 10 of the first embodiment comprises an input pen 21. This input pen 21 is connected to the main body 22 of the information processing apparatus 10 by means of a cable. Of the function blocks of the data input system shown in FIG. 1, the image scanner 12, the contact sensor 13 and the moving distance sensor 14 are arranged at the distal end of the input pen 21. A group of buttons, which are part of the key input section 18, are provided on the side surface of the input pen 21. The control section 11, the image character recognition section 15, the online character recognition section 16 and the display section 17 are provided for the main body 22 of the information processing apparatus. A keyboard, which is part of the key input section 18, is connected to the main body 22.

Figure 3:
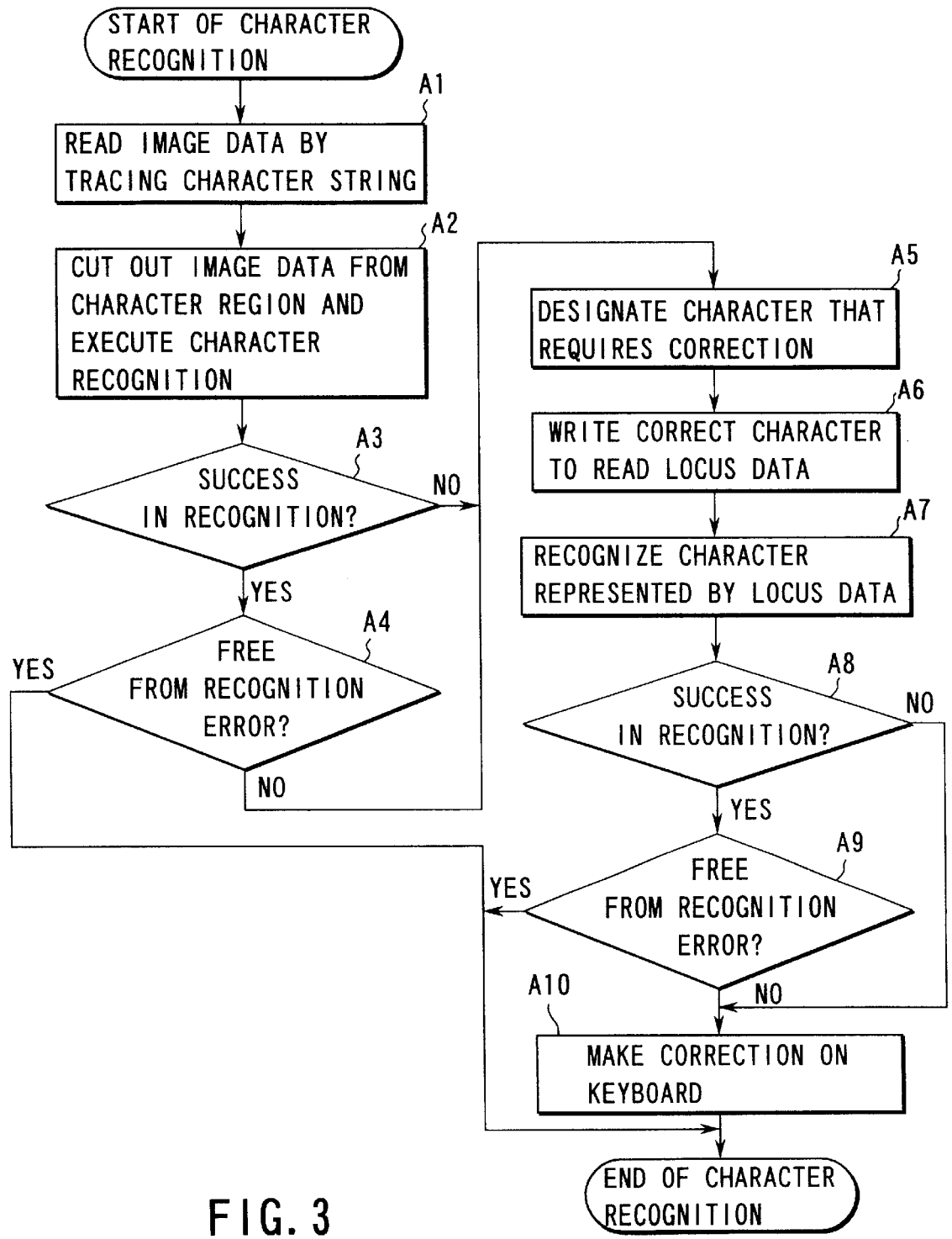
FIG. 3 is a flowchart for illustrating the procedures by which the data input system of the first embodiment executes character recognition.

The operations which the data input system of the first embodiment performs for the execution of character recognition will be described with reference to FIG. 3.

First of all, the user traces a character string to be recognized by means of the input pen 21. By this tracing operation, the image data on the character string is entered from the image scanner (Step A1).

The image data entered from the image scanner 12 is supplied to the image character recognition section 15. The image character recognition section 15 cuts out a character region from the image data and executes character recognition with respect to the character region (Step A2). Characters recognized by the image character recognition section 15 are displayed on the display section 17 as recognition results.

The user checks whether or not all characters displayed on the display section 17 are correct. If all characters are correct ("YES" in Step A3 and "YES" in Step A4), the recognition results for the character string are fixed, and recognition processing is performed with respect to the next character string. The recognition results are fixed by depressing an operation button, which is one of the operation buttons on the side surface of the input pen 21 and is assigned to the result fixing. If the characters on the display section 17 include a character indicated as an error, which means an recognition failure ("NO" in Step A3), or include a character incorrectly recognized ("NO" in step A4), such a character is designated as requiring correction (Step A5). A character to be corrected is designated by using operating buttons, which are included among the operation buttons on the side surface of the input pen 21 and are assigned to the designation of a character requiring correction. To be more specific, the designation is made by depressing two operation buttons, one being a button for moving a cursor (displayed on the display section 17 together with the characters) right and left so as to select one of the characters, and the other being a button for designating the character displayed at the same position as the cursor as being a character requiring correction.

After designating the character that requires correction, the user writes the correct character with the input pen 21. By so doing, moving distance data (locus data) including a direction is entered from the moving distance sensor 14 (Step A6).

The direction-included moving distance data entered from the moving distance sensor 14 is supplied to the online character recognition section 16. The online character recognition section 16 traces the locus of movement on the basis of the moving distance data and recognizes a character represented by the traced locus of movement (Step A7). The character recognized by the online character recognition section 16 is displayed on the display section 17 as a result of recognition, in place of the correction-required character.

In the case where the character displayed on the display section 17 is correct ("YES" in Step A8 and "YES" in Step A9), the recognition results for the character string are fixed, and recognition processing is performed with respect to the next character string. If the written character is indicated as an error, which means an recognition failure ("NO" in Step A8), or if it is incorrectly recognized ("NO" in step A9), character correction is performed by operating the keyboard connected to the main body 22 of the information processing apparatus (Step A10).

If a character cannot be recognized or is recognized incorrectly, the operation mode is switched from the ordinary input processing mode to the correction processing mode (or from the correction processing mode to the ordinary input processing mode). In most cases, however, the data input system of the first embodiment does not compel the user to switch from the input pen to the keyboard (or from the keyboard to the input pen), as can be seen from the above description. Hence, the user is relieved from the burden of the correction of recognized characters, and the data input operation can be executed with high efficiency.

Figure 4:
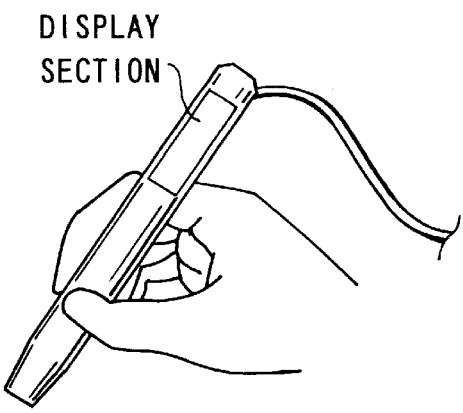
FIG. 4 shows how the input pen of the first embodiment looks like when the input pen is provided with a display section.

FIG. 4 shows how the input pen 21 looks like when a display section 17 is provided for it, not for the main body 22 of the information processing apparatus. As shown in FIG. 4, the display section 17 is provided on the side portion of the input pen 21. Results of recognition, which are supplied from the image character recognition section 15 and the online character recognition section 16, are displayed on the input section 17 on the side portion of the input pen 21. Owing to this feature, the user can confirm the result of recognition without having to look greatly away from the position of the present processing. Accordingly, the asthenopia (eye fatigue) of the user can be suppressed.

Figure 5:
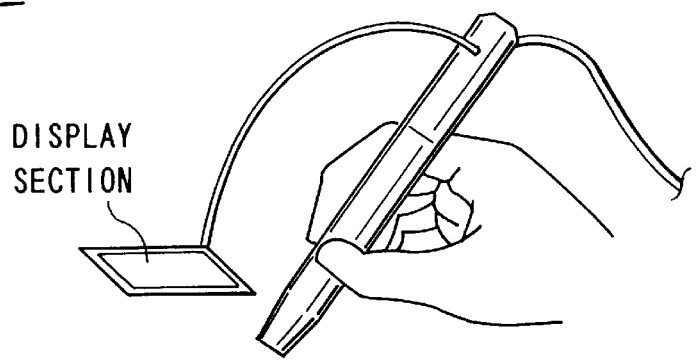
FIG. 5 shows how the input pen of the first embodiment looks like when the input pen is provided with a removable display section.

FIG. 5 shows how the input pen 21 looks like when it is provided with a removable display section 21. In the case where the display section 17 is removable from the input pen, as shown in FIG. 5, the user can confirm the result of recognition by slightly turn his or her eyes. Accordingly, the burden on the eyes of the user can be further lightened.

If an infrared transmitting/receiving section is provided for each of the input pen 21 and the main body 22 of the information processing apparatus, it is not necessary to employ the cable that connects the input pen 21 and the main body 22. In this case, therefore, the input pen 21 can be used with a high degree of freedom.

The first embodiment was described, referring to the case where data are entered by tracing a character string with the input pen, which contains the image scanner, contact sensor and moving distance sensor at the distal end, or by writing a character with the input pen. Needless to say, however, the present invention is not limited to this. For example, the image scanner, contact sensor and moving distance sensor described above may be arranged at a corner portion of the casing of an electronic device, such as a palm top type PDA terminal or a portable telephone. In this case, data are entered by tracing a character string with the corner portion of the casing or by writing a character with the corner portion, and the advantages of the first embodiment remain the same.

By way of example, let us assume that a portable telephone has a telephone directory function and that name and telephone written on a business card are registered in the telephone directory of the telephone. In this case, the user can register the name and telephone number by tracing them with the corner of the casing of the telephone. Even if a character or a number is incorrectly recognized, such a character or a number can be re-entered by writing it with the corner of the casing.

The first embodiment was described, referring to the case where a correction-required character is designated by use of operation buttons that are provided on the side of the input pen 21 for character designation. Instead of this, it is possible to employ a contact sensor for outputting coordinate data representing a contact point in response to the user touching the display panel of the display section 17. In the case where the contact sensor is employed, the user looks at the display panel and designates a correction-required character by touching it on the display panel with his finger. This alternative structure is advantageous when it is reduced to practice.

(Second Embodiment)

Figure 6:
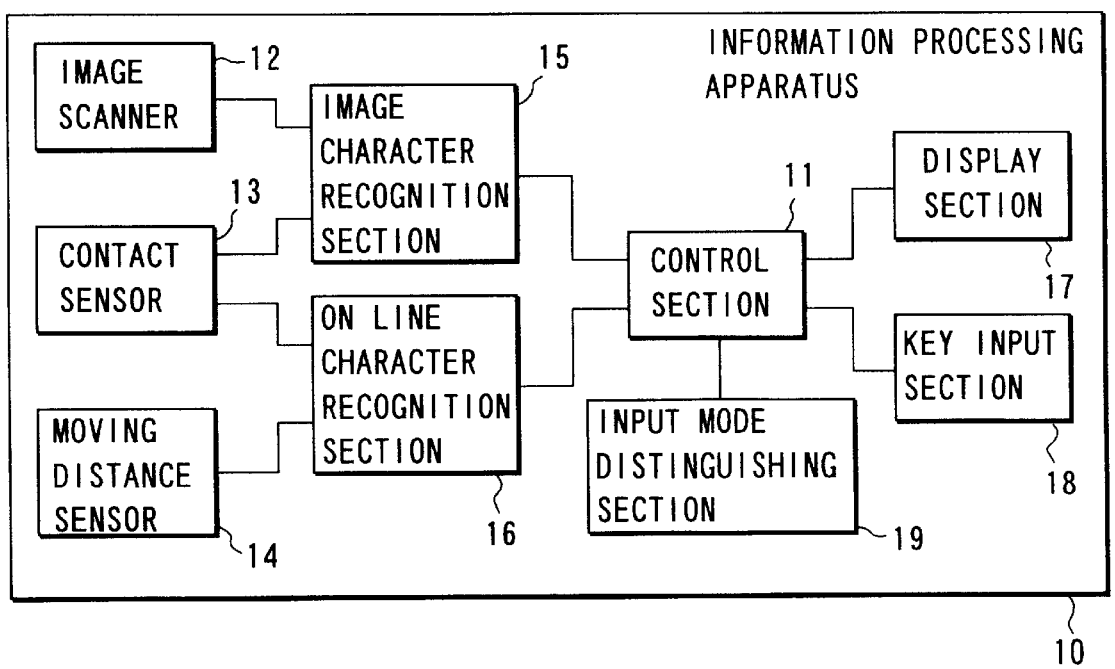
FIG. 6 is a diagram showing the function blocks of a data input system, which is employed in an information processing apparatus according to the second embodiment of the present invention.

Next, the second embodiment of the present invention will be described. FIG. 6 is a diagram showing the function blocks of a data input system employed in an information processing apparatus according to the second embodiment of the present invention.

Figure 7:
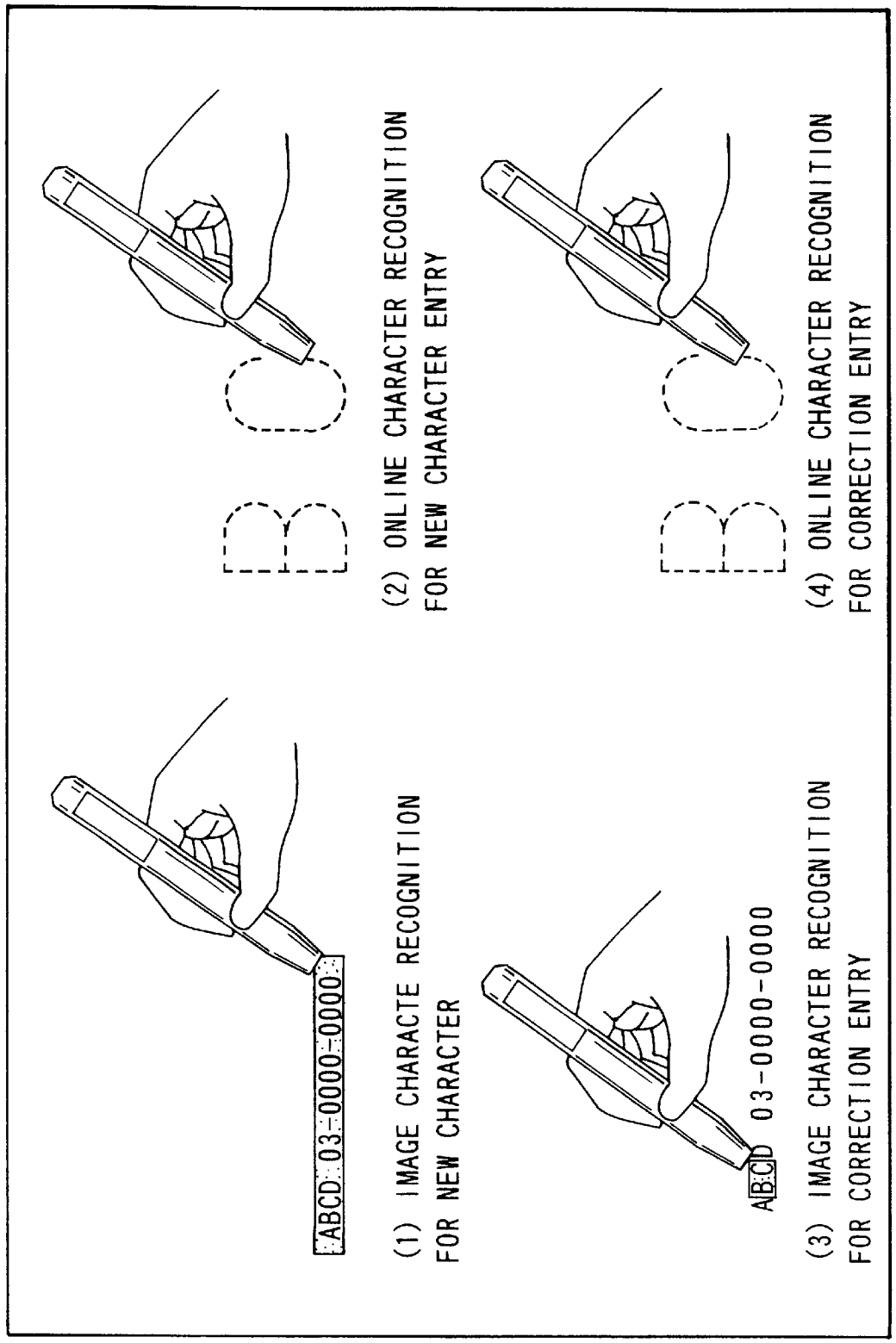
FIG. 7 illustrates the four input modes of the data input system of the second embodiment.

As can be seen from FIG. 6, the data input system of the second embodiment is obtained by adding an input mode distinguishing section 19 to the data input system of the first embodiment shown in FIG. 1. The data input system of the second embodiment is featured in that the input mode distinguishing section 19 automatically distinguishes among four input modes in accordance with the manner in which the input pen 21 is used. As shown in FIG. 7, the four input modes are: (1) a mode in which a character string is traced for new character entry (image character recognition for new entry); (2) a mode in which a character is written for new entry (online character recognition for new character entry); (3) a mode in which a character string is traced for correction entry (image character recognition for correction entry); and (4) a mode in which a character is written for correction entry (online character recognition for correction entry). Since one of these four input modes is automatically identified or determined, the user does not have to operate the buttons on the side of the input pen 21 for the switching of input modes. Accordingly, the data input operation can be performed with higher efficiency.

The data input system of the second embodiment provides a user with the following two input routes:

(a) First Route: (image character recognition for new character entry)→(image character recognition for correction entry)→(online character recognition for correction entry)

(b) Second Route: (online character recognition for new character recognition)

Figure 8:
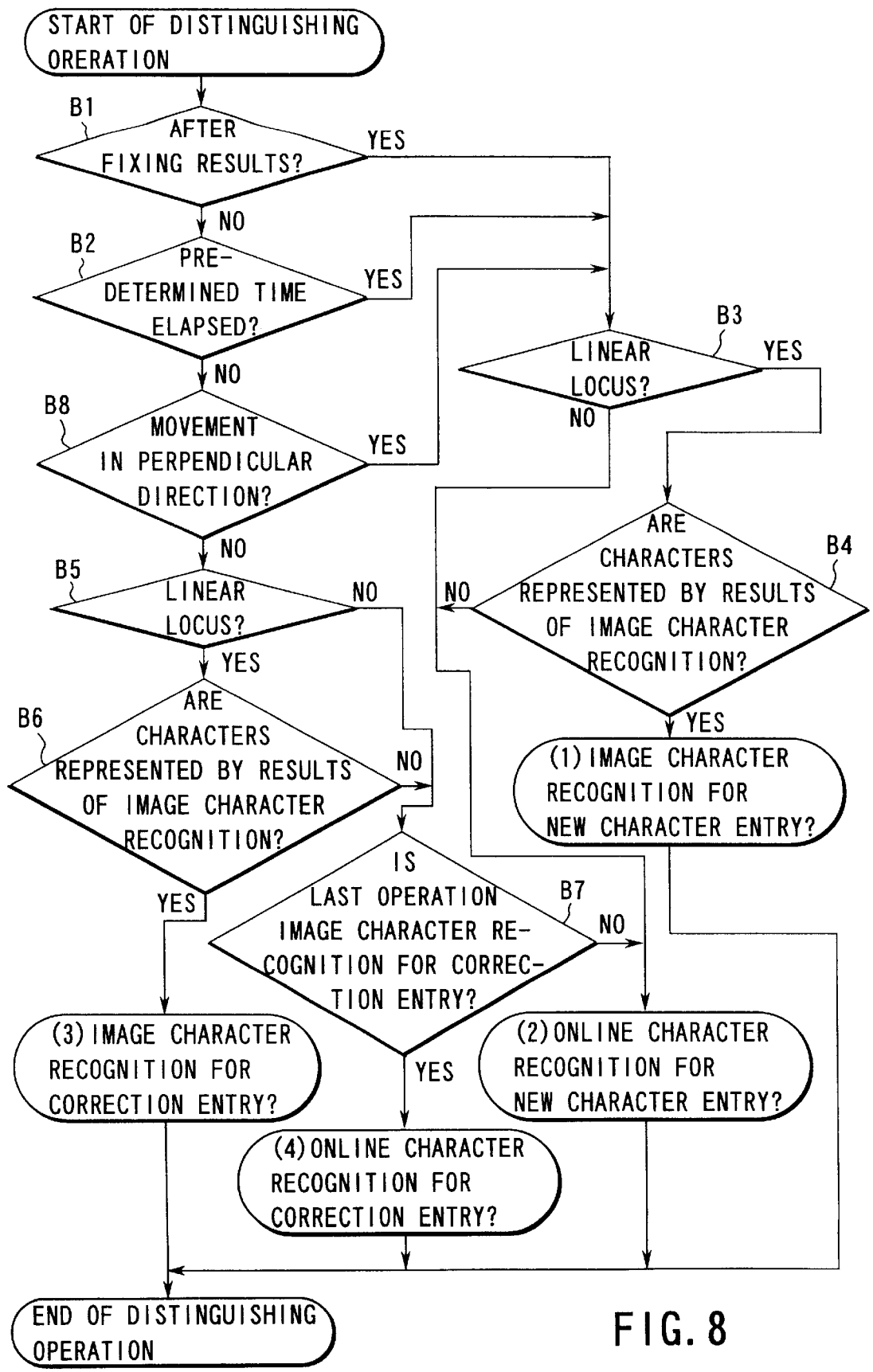
FIG. 8 a flowchart for illustrating the automatic identification procedures by which the input mode used by the data input system of the second embodiment is identified.

A description with be given with reference to FIG. 8, as to how the data input system of the second embodiment automatically distinguishes among input modes.

When the user traces a character string to be recognized with the input pen 21 or writes a character with it, the image character recognition section 15 and the online character recognition section 16 operate in response to a signal output from the contact sensor 13. Then, the input mode distinguishing section 19 determines whether the operation of the recognition sections 15 and 16 is immediately after the results of the last character recognition are fixed ("YES" in Step B1) or whether it is a predetermined time after the results are fixed ("YES" in Step B2). (The predetermined time is a time sufficiently longer than a time required for writing one character.) If the operation is not immediately after the results are fixed ("NO" in Step B1) and the predetermined time has not yet elapsed ("NO" in Step B2), a check is made to see whether the present locus of movement is perpendicular to the last linear locus of movement. If this is the case ("YES" in Step B8), a check is first made to see whether or not the present locus of movement traced by the online character recognition section 16 is linear (Step B3). If the present locus is linear ("YES" in Step B3), the results of recognition obtained by the image character recognition section 15 are examined (Step B4). If the examination shows that the results of recognition represent a character string ("YES" in Step B4), it is determined that the image character recognition for new character entry is being executed, and the results of the last character recognition are fixed. (Hence, the fixing operation by the user is not needed.) Whether or not the present locus of movement is perpendicular to the last locus of movement can be determined by checking that the last operation is either image character recognition for new character entry or image character recognition for correction entry and by examining whether the movement start point of the last image character recognition for new character entry and the movement start point of the present operation satisfy the predetermined positional relationship. If the locus of movement traced by the online character recognition section 16 is not linear ("NO" in step B3) or if the results of recognition obtained by the image character recognition section 15 do not represent a character string ("NO" in Step B4), it is determined that online character recognition for new character entry is being executed. The results of recognition obtained by the image character recognition section 15 are not considered to represent a character string, if "–" (a hyphen or "minus" sign) is written.

If the operation of the recognition sections 15 and 16 is not immediately after the results are fixed ("NO" in Step B1) and the predetermined time has not yet elapsed ("NO" in Step B2), a check is made to see whether the present locus of movement is perpendicular to the last linear locus of movement, as described above. If this check shows that the present locus of movement is not perpendicular to the last linear locus ("NO" in Step B8), then the input mode distinguishing section 19 first determines whether the present locus of movement traced by the online character recognition section 16 can be regarded as being linear (Step B5). If the present locus can be regarded as such ("YES" in Step B5), the results of recognition obtained by the image character recognition section 15 are examined (Step B6). If the examination shows that the results of recognition represent a character string, it is determined that image character recognition for correction entry is being executed. If the locus of movement traced by the online character recognition section 16 cannot be regarded as being linear ("NO" in Step B5) or if the results of recognition do not represent a character string ("NO" in Step B6), a check is made to see whether or not the last operation is image character recognition for correction entry (Step B7). If the check shows that the last operation is image character recognition for correction entry ("YES" in Step B7), then it is determined that online character recognition for correction entry is being executed. If the check shows that the last operation is not image character recognition for correction entry ("NO" in Step B7), then it is determined that online character recognition for new character entry is still continued.

As described above, according to the data input system of the second embodiment, the user is not compelled to manually switch the input mode from one to another before he or she starts the following operations: (1) image character recognition for new character entry, (2) online character recognition for new character entry, (3) image character recognition for correction entry, and (4) online character recognition for correction entry.

As can be seen from the above, the user does not have to perform the operation for designating a character to be corrected. The user is only required to trace that character. Even if this image character recognition for correction entry ends in failure, all the user has to do is merely to write the character in question since the character is specified then.

Where character strings of different lines are traced, data on the character string of one line are automatically fixed when the input pen is moved from the end of the line to the start of the next line. Accordingly, the user does not have to manually fix the data on character strings each time one line is scanned.

(Third Embodiment)

The third embodiment of the present invention will now be described. In the data input system of the third embodiment, the moving distance sensor 14 and the online character recognition section 16, which are structural elements of the data input systems of the first and second embodiments shown in FIGS. 1 and 6, are utilized for the selection of a menu.

Figure 9:
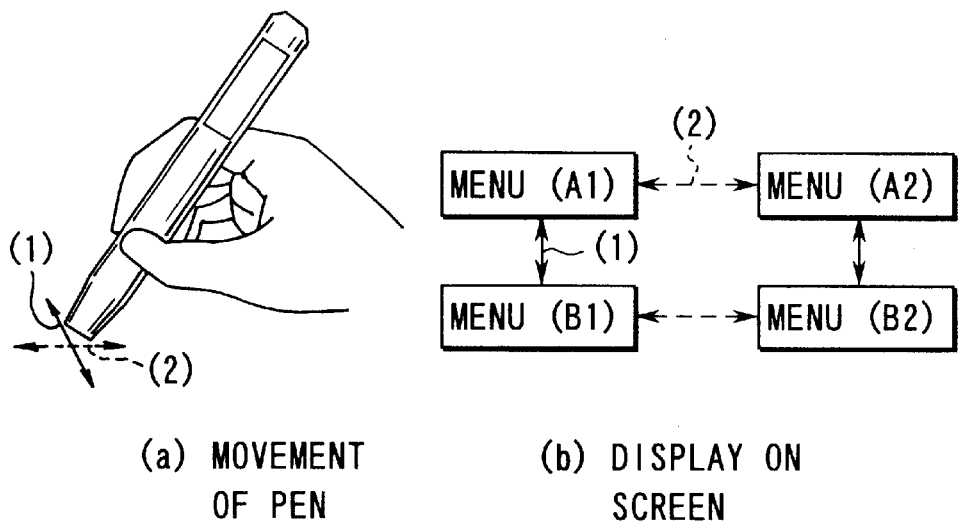
FIG. 9 shows how one of menu items arranged in two dimensions is selected by a data input system according to the third embodiment of the present invention.
Figure 10:
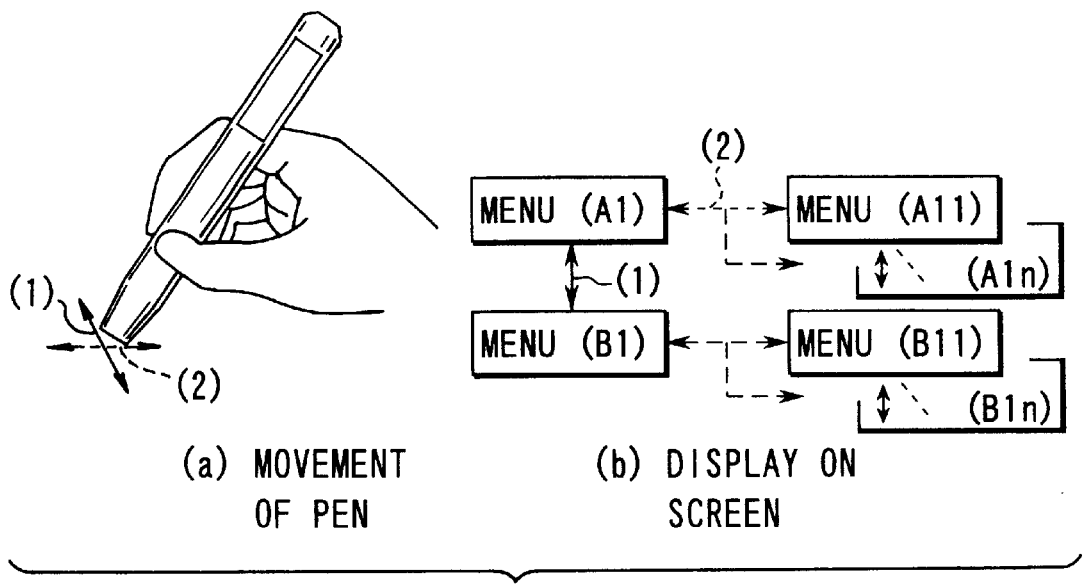
FIG. 10 shows how one of menu items arranged hierarchically is selected by the data input system of the third embodiment.

As shown in FIG. 9, for example, when the input line is operated to draw a straight line in the first and second directions (1) and (2), data on the locus of movement are read from the moving distance sensor 14 as moving distance data including a direction, and the locus of movement is traced by the online character recognition section 16 on the basis of the moving distance data. In accordance with the traced locus of movement, the data input system of the third embodiment selects one menu from among a number of menus, which are prepared as options beforehand and presented in a two-dimensional arrangement. A number of menus as options may be arranged to have a hierarchical structure, as shown in FIG. 10. If, in this case, the traced locus of movement is in the first direction (1), the presently active menu switches to another menu of the same class. If the traced locus of movement is in the second direction (2), it switches to another menu of a different class.

As can be seen from this, the data input system of the third embodiment need not comprise a tablet superposed on the display section 17. Without such a tablet, the user can select a menu by moving the input pen 21.

Figure 11:
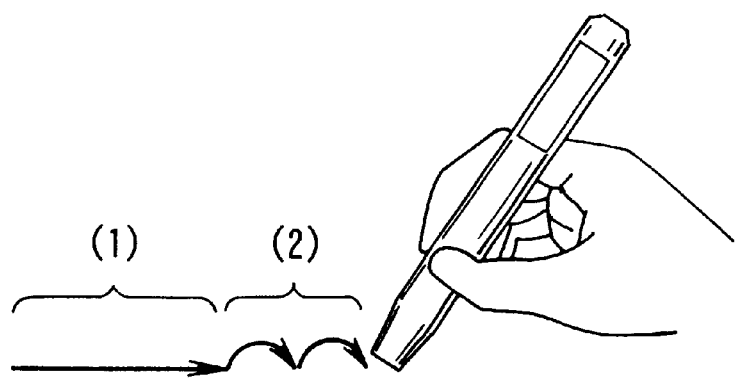
FIG. 11 shows how the moving speed is changed between menus according to the data input system of the third embodiment.

When selecting a menu, the user can move the input pen 21 in such a manner that (1) the traced locus describes a solid line or that (2) it describes a dotted line, as shown in FIG. 11. The speed at which the active menu is switched to another menu may be controlled to be different between those manners.

If the menu switching speed is controlled as above, broad movement for menu switching can be performed by drawing a solid line, while precise movement for menu switching can be performed by drawing a dotted line. Menu selection can be performed based on a combination of these two kinds of movement.

Figure 12:
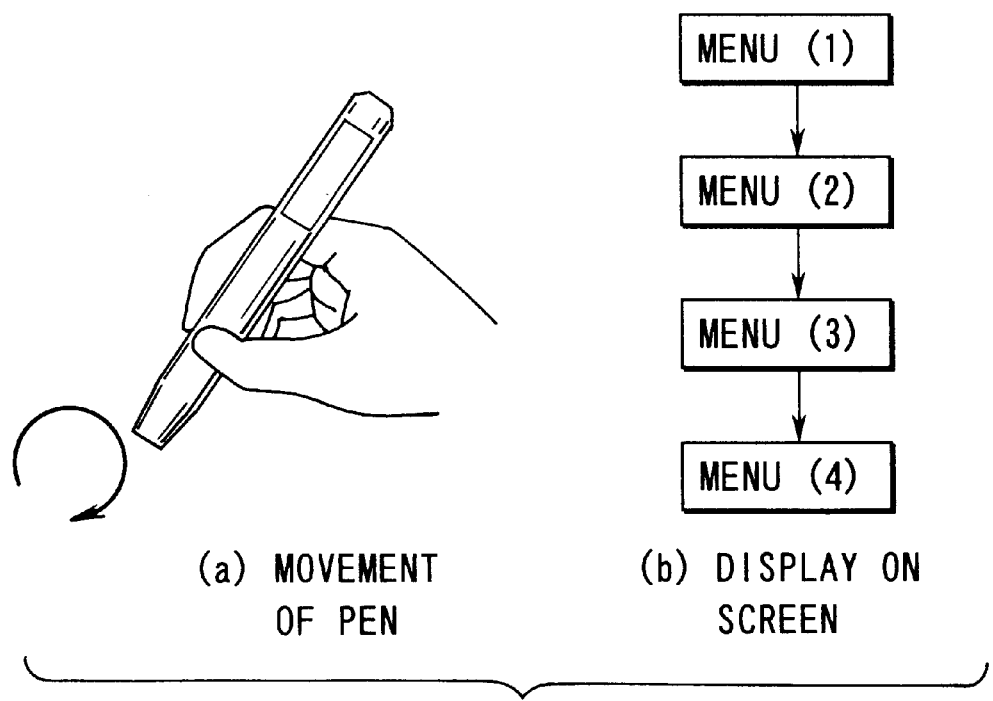
FIG. 12 shows how a menu item is selected in accordance with the drawing of a circle according to the data input system of the third embodiment.

As shown in FIG. 12, the presently active menu can be switched to the adjacent menu each time the traced locus of movement describes a circle. This technique also enables the user to select a menu with the input pen 21, with no need to employ a tablet.

A character represented by the traced locus of movement may be first recognized by the online character recognition section 16. In this case, a menu is selected from among a number of menus, with the recognized character used as a search key. After this menu selection, the active menu can be switched to the selected one by performing the operations shown in FIGS. 9 to 12.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data input system which comprises a main apparatus and an input pen externally connected to the main apparatus, and which inputs data in accordance with a manner in which the input pen is operated, said input pen having:
an image scanner; and
a moving distance sensor, and
said main apparatus including:
first character recognition means for cutting out a character region from image data read by the image scanner of the input pen, and for executing character recognition;
correction-required character specifying means for specifying a character from among a sequence of characters recognized by the first character recognition means;
second character recognition means for tracing a locus of movement based on moving distance data, which is obtained by the moving distance sensor of the input pen and includes a moving distance and a moving direction, and for recognizing a character written with the input pen based on the traced locus of movement; and
recognized character correcting means for replacing a character recognized by the first character recognizing means and specified as a correction-required character by the correction-required character specifying means with a character recognized by the second character recognition means.

2. A data input system according to claim 1, wherein said input pen further includes display means for displaying a sequence of characters recognized by the first and second character recognition means.

3. A data input system according to claim 2, wherein said input pen includes means for removably coupling the display means thereto.

4. A data input system according to claim 1, wherein:
said input pen includes at least one operation button; and
said correction-required character specifying means includes means for specifying a correction-required character from among a sequence of characters recognized by the first character recognition means, in accordance with depression of the operation button.

5. A data input system according to claim 2, wherein:
said display means includes a contact sensor for outputting coordinate data on a contact point where a display panel of the display section is touched; and
said correction-required character specifying means includes means for specifying a correction-required character from among a sequence of characters recognized by the first character recognition means, in accordance with the coordinate data output from the contact sensor.

6. A data input system according to claim 1, wherein each of said input pen and said main apparatus includes infrared transmission/reception means for transmitting or receiving data by way of a wireless path.

7. A data input system according to claim 1, further comprising:
item selection means for causing the moving distance sensor to detect a scroll operation performed with the input pen, and for displaying a selection item on the basis of a detected locus of the scroll operation.

8. A data input system according to claim 7, wherein said item selection means includes means for displaying an item from among items presented in a two-dimensional arrangement, in accordance with the scroll operation performed with said input pen performs in X and Y directions.

9. A data input system according to claim 7, wherein said item selection means includes means for displaying an item from among items presented in a hierarchical arrangement, in accordance with the scroll operation performed with said input pen in X and Y directions.

10. A data input system according to claim 7, wherein said item selection means includes means for varying a scroll speed in accordance with a manner in which the input pen describes a solid line or a dotted line.

11. A data input system according to claim 7, wherein said item selection means includes means for displaying another selection item in accordance with a manner in which the input pen describes a circle.

12. A data input system according to claim 1, further comprising:
    first item selection means for selecting one item from among a plurality of items by using the character recognized by the second character recognition means as a search key, and for displaying the selected item; and
    second item selection means for displaying a second selection item, said second item selection means causing the moving distance sensor to detect a locus of a scroll operation performed with the input pen after said one item is displayed by the first item selection means, and displaying the second selection item on the basis of the locus detected by the moving distance sensor.

13. A data input system which comprises a main apparatus and an input pen externally connected to the main apparatus, and which inputs data in accordance with a manner in which the input pen is operated,
    said input pen having:
    an image scanner; and
    a moving distance sensor, and
    said main apparatus including:
        first character recognition means for cutting out a character region from image data read by the image scanner of the input pen, and for executing character recognition;
        second character recognition means for tracing a locus movement based on moving distance data, which is obtained by the moving distance sensor of the input pen and includes a moving distance and a moving direction, and for recognizing a character written with the input pen based on the traced locus of movement; and
        distinguishing means for automatically distinguishing among newly input data provided by the first character recognition means, corrected input data provided by the first character recognition means, newly input data provided by the second character recognition means, and corrected input data provided by the second character recognition means, in accordance with a manner in which the input pen is operated.

* * * * *